UNITED STATES PATENT OFFICE.

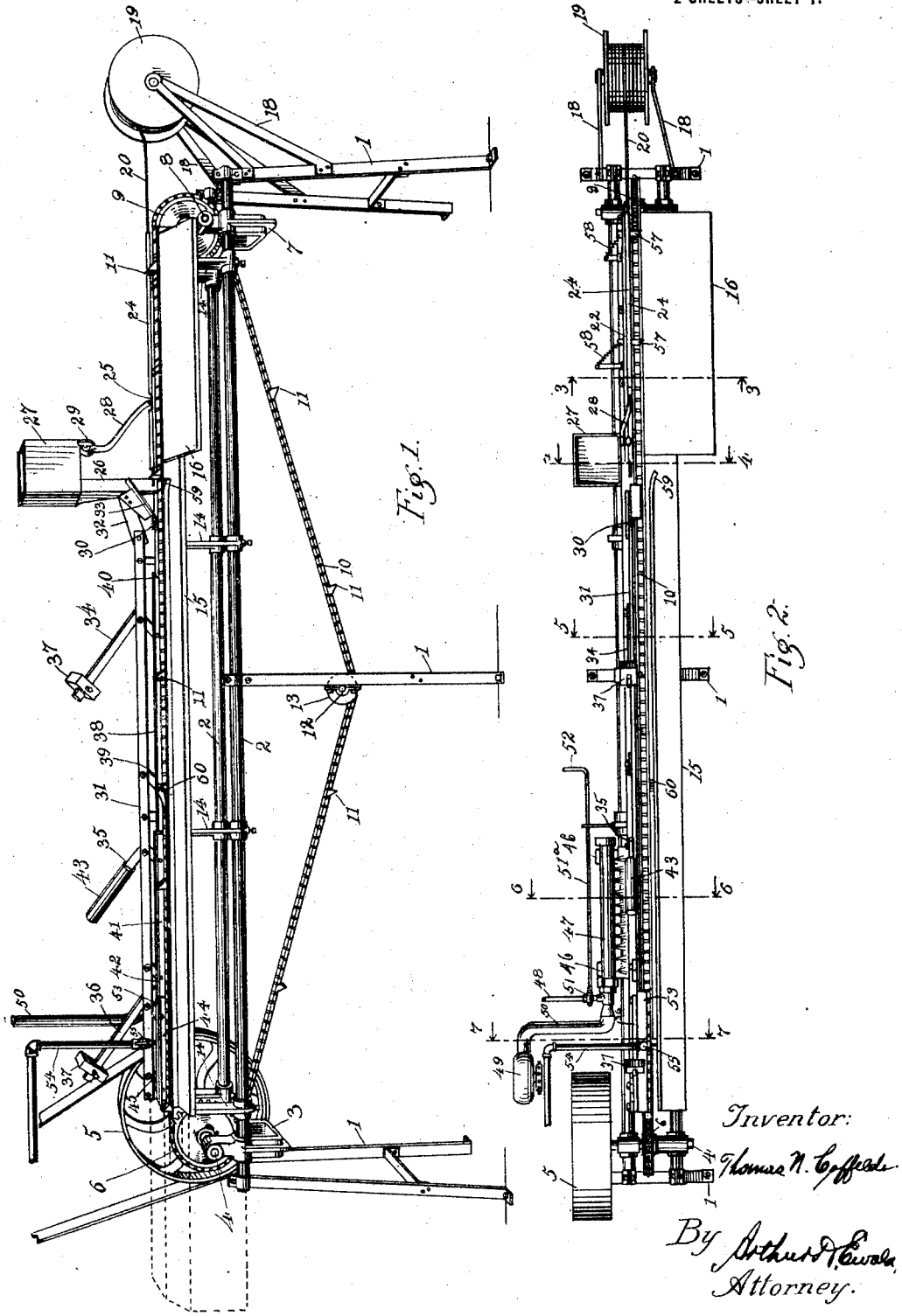

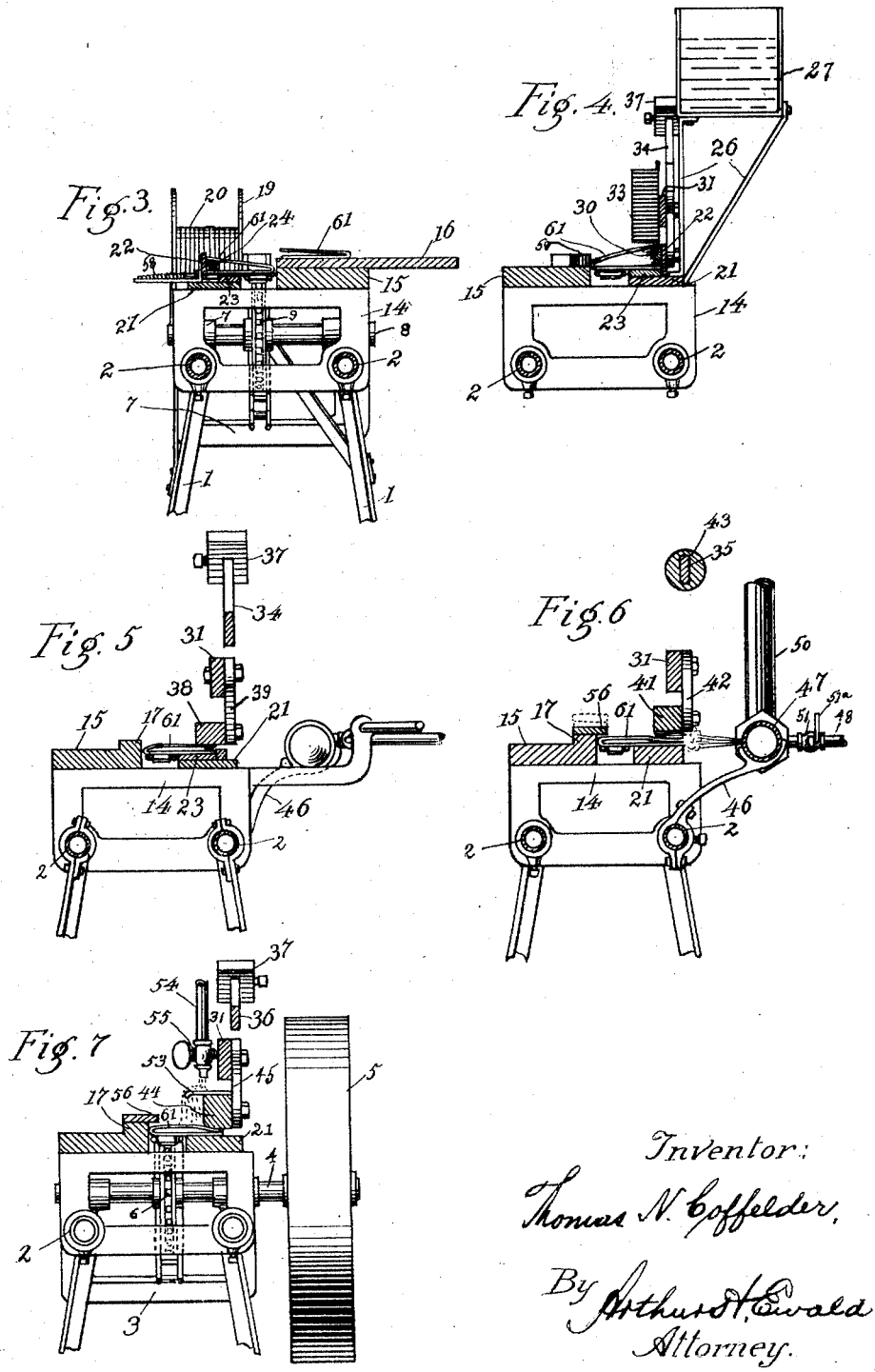

THOMAS N. COFFELDER, OF CINCINNATI, OHIO, ASSIGNOR, BY MESNE ASSIGNMENTS, TO LIBERTY RADIATOR COMPANY, OF PITTSBURGH, PENNSYLVANIA, A CORPORATION OF PENNSYLVANIA.

SOLDERING-MACHINE.

1,367,018.       Specification of Letters Patent.     Patented Feb. 1, 1921.

Application filed April 8, 1918. Serial No. 227,260.

*To all whom it may concern:*

Be it known that I, THOMAS N. COFFELDER, a citizen of the United States, and a resident of Cincinnati, in the county of Hamilton and State of Ohio, have invented certain new and useful Improvements in Soldering-Machines, of which the following is a full, clear, and exact description, reference being had to the accompanying drawings, forming a part of this specification.

My invention relates to soldering machines, and is directed particularly to the provision of a machine adapted and arranged to solder radiator tubes, and other similar tubes, internally.

In the soldering of tubes of the character mentioned it has heretofore been the general practice to dip the tubes into the solder, thus causing a certain amount of the solder to enter the joint and secure the same. It is found, however, that in the practice of this method, the solder is not evenly distributed in the joint, and the seam is, in fact, very defectively secured at points on many occasions. One object of my invention is to provide means whereby a thin ribbon of solder may be introduced between the edges to be soldered, thus assuring an even distribution of the solder and a uniformly perfect seam throughout its length, with a saving also, of a large per cent. of the solder which is wasted in the dipping process, by reason of its adherence to parts of the tube where its presence is of no beneficial effect.

In my co-pending applications for patents on radiator constructions, I have disclosed, in connection with the other details of said radiator constructions, single piece flat tubes, to the construction and soldering of which my present invention is particularly designed and adapted. Said applications bear Serial Numbers 157,092 and 183,702 respectively.

Other objects of my invention will appear from the following description thereof in connection with the appended claims.

In the drawings:

Figure 1 is a perspective of my new soldering machine;

Fig. 2 is a plan view of the same;

Fig. 3 is a cross-section on line 3—3 of Fig. 2;

Fig. 4 is a cross section on line 4—4 of Fig. 2;

Fig. 5 is a cross section on line 5—5 of Fig. 2;

Fig. 6 is a cross section on line 6—6 of Fig. 2;

Fig. 7 is a cross section on line 7—7 of Fig. 2.

The numeral 1 indicates the standards upon which my machine is mounted. Secured in the upper ends of the said standards are two parallel horizontal rods 2—2. Near one end of the rods 2—2 is a yoke 3 in the upper part of which a shaft 4 is journaled. Mounted on one end of the shaft 4 is a pulley 5, by means of which the machine is driven. Mounted on the shaft 4 between the rods 2—2 is a sprocket wheel 6. Secured near the other ends of the rods 2—2 is a second yoke 7 having a shaft 8, upon which shaft a sprocket wheel 9 is secured. A chain 10 is mounted on the wheels 6 and 9, being driven by the former. The chain 10 is provided throughout its length at regular intervals with lugs 11. On a shaft 12, journaled between the middle standards 1, is an idler 13, provided for the usual purpose.

Mounted on brackets 14 on the rods 2—2 is the table 15, which extends throughout the length of the machine. Near its right hand end the machine is also provided with a feed table 16, which is of greater width than the table 15, and is adapted to receive a number of the tubes to be soldered. The table 15 has its inner edge adjacent to, and parallel with, the line of travel of the chain 10 between the sprocket wheels 6 and 9, and the said edge of the table is provided with a short upward extension 17, which serves as a lateral guide for the tubes as they are conveyed through the machine while being soldered.

Between brackets 18, which extend outwardly from the right hand end of the machine, a spool 19 is mounted. The spool 19 carries a ribbon of solder 20 to be used in soldering the tubes.

Mounted on the brackets 14, contiguous to and on the opposite side of the chain 10 from the table 15, is a shelf 21, which is arranged to support the tubes during the several processes to which they are subjected in the machine. On the shelf 21, near the right hand end of the machine, is a guide plate 22; also on the shelf 21 is a supporting plate 23, arranged to support the tubes during the initial step in the soldering process. Secured to the front face of the guide plate 22, or otherwise suitably supported in front of said plate, at an elevation slightly above the plate 23 is a tube 24 through which the ribbon of solder, 20, is fed into the tubes as hereinafter set forth. Near one end of the tube there is an opening 25 in its upper side. Supported on a bracket 26 on the shelf 21 is an acid tank 27, which is provided with a discharge tube 28 for discharging acid into the opening 25 of the tube 24. A valve 29 controls the flow of the acid.

Secured to the front face of the guide plate 22, beyond the left end of the tube 24 and in line therewith, is an acid distributing brush 30. Mounted above the shelf 21 by means of suitable brackets, is a bar 31, which carries the various mechanisms for operating on the tubes after the ribbon of solder has been inserted between the edges to be secured. The right hand end of said bar has an inclined extension 32, to the free end of which a guide plate 33 is secured, the said plate being arranged to compress the open edges of the tube, between which the ribbon of solder has been inserted, upon the acid distributing brush 30, for the purpose of spreading the acid evenly over the surfaces to be soldered.

Pivotally secured to the bar 31, from right to left respectively at the required intervals, are bell crank levers 34, 35 and 36. The upper arms of the levers 34 and 36 are provided with adjustable weights 37. Pivotally secured to the lower short arm of the lever 34 is a compression bar 38; the free end of the bar 38 is similarly secured to a link 39 pivoted to the bar 31. The right hand end of the bar 38 is beveled, as shown at 40, to permit the automatic insertion of the ends of the tubes under the bars during their travel, as hereinafter set forth. Pivotally secured to the lower arm of the lever 35 is a soldering bar 41; the free end of said bar is similarly secured to a link 42 pivoted to the bar 31. The upper arm of the lever 35 is provided with a weighted handle 43. To the lower arm of the lever 36, there is secured a cooling bar 44, the same being pivoted to said arm and to a link 45, which latter is also pivoted to the bar 31. The bar 44 should be made of aluminum, for the reason that this metal will not adhere to the melted solder of the tubes as they are compressed for cooling. The adjacent ends of the bars 41 and 44 are arranged to contact as the bar 41 is moved slightly to the left in being lifted by the handle 43, thus also raising the cooling bar as will be apparent.

Mounted on a bracket, or brackets, 46, to the rear of the shelf 21, is a gas, or other, burner 47, supplied by a pipe 48. Air is introduced to the burner, to provide a flame of suitable intensity, by means of a blower 49 and a pipe 50. The valve 51 in the gas line is operated from a convenient point by means of a stem 51ª and handle 52 suitably located.

Secured on the upper side of the cooling bar 44 is a metal plate 53, upon which water from a pipe 54 is discharged to keep the bar 44 constantly cooled, the plate 53 serving as a channel to distribute the water throughout the length of the bar. A valve 55 controls the water supply.

The guide plate 17, opposite the soldering bar 41 and the cooling bar 44, is provided with overlapping plates 56, which prevent the free edges of the tubes from raising while the opposite edges are being compressed while operated upon by the soldering and cooling bars.

Pivotally mounted on the shelf 21, under the tube 24, are two spring controlled fingers 57, the same extending forward over the chain 10, and being arranged to yield against the tension of springs 58 to permit the passage of the lugs 11, after which the springs cause them immediately to resume their normal position over the chain. These fingers serve to guide the edges of the tube as it is inserted in the machine, causing the lower edge, which is inserted upon the fingers to pass under the tube 24, and the other to pass above said tube.

The guide 17 and the plate 56 are curved outwardly and upwardly respectively, as shown at 59 and 60 respectively, to provide for the easy entrance of the tubes into the respective guideways.

The operation of my new soldering machine is as follows: The machine as comprising the details of construction above described, is particularly adapted for internally soldering the edges of one piece flat radiator tubes, shown in section and end elevation in Figs. 3 to 7, both inclusive, at 61. The tubes of this description, unsoldered, are placed on the table 16, being thence fed by the operator, one at a time, into the machine, by placing each in front of one of the lugs 11 on the chain 10, with one of the open edges of the tube resting on the fingers 57, and the other edge passing above the tube 24. The ribbon of solder having previously been inserted through the tube 24, the end of the said ribbon is hooked upon the forward end of the initial tube so as to cause the solder to begin feeding with the tubes. The flux has been applied to the solder at the opening 25 in the tube 24. As the lug 11 causes the tube to progress, it, with the solder, is carried past the distributing brush 30, one edge of the tube being under the brush and the other edge above the same, as shown in Fig. 4. The flux on the solder is thus thoroughly distributed. Further proceeding, the tube passes under the compression bar 38, where it is subjected to some pressure and the edges of the tube and the ribbon of solder are brought into proper position for completion of the seam. From the bar 38 the tube edges pass under the soldering bar 41, where the heat produced by the flames from the burner 47 causes the solder to fuse, and the pressure of the heated bar 41 completes the union of the tube edges.

From the soldering bar, the tube edges, now a completed seam, pass under the cooling bar 44, which is thus brought into contact with the seam and cools the same under pressure sufficiently to cause the solder to set. The tube is then automatically discharged from the machine.

It will be undestood that, after the solder has been secured in the initial tube by hooking it to the forward end of said tube, it is not necessary further so to secure the ribbon to the succeeding tubes, for the reason that the frictional contact of the ribbon with the edges of the tubes as they pass under the bar 38 is sufficient to cause the feeding of the solder to all tubes succeeding the first.

In the foregoing specification and in the drawings I have described and illustrated one typical form of my invention as it is applied to the internal soldering of tubes of a particular design. It will be understood, however, that the principle of my invention as therein disclosed, is susceptible of many modifications in details and in its application to tubes and devices of various character, and I do not, therefore, wish to be limited to the details above set forth, but to cover as well all such modifications of the principle disclosed as fall reasonably within the scope of the appended claims.

Having thus fully described my invention, what I claim as new and desire to secure by Letters Patent, is:

1. In a soldering machine, in combination with means for conveying articles to be soldered through the machine, means for supplying a ribbon of solder between the edges of said articles, means for fusing said solder, and a pressure device arranged to bear against said seam subsequent to the heating of the solder for cooling the same and causing the solder to set, substantially as set forth.

2. In a soldering machine, in combination with means for conveying articles to be soldered through the machine, means for supplying a ribbon of solder between the edges of said articles, means for using said solder, a pressure bar arranged to bear against said seam subsequent to the heating of the solder for cooling the same and causing the solder to set, and means for raising and lowering said bar, substantially as set forth.

3. In a soldering machine in combination with a conveyer arranged to convey articles through the machine in such a manner that the edges to be soldered extend laterally beyond said conveyer, means arranged to be between the edges of said articles when on said conveyer for supplying solder between said edges, and means for fusing said solder and uniting said edges, said means being located laterally adjacent said conveyer beyond said solder supplying means, substantially as set forth.

4. In a soldering machine, in combination with means for conveying articles to be soldered through the machine, means whereby a ribbon of solder is fed between the edges of said articles, a soldering bar arranged to press said edges together, means for heating said solder while under said bar to fuse the same, and means for raising and lowering said bar, substantially as set forth.

5. In a soldering machine, in combination with means for conveying articles to be soldered through the machine, means whereby a ribbon of solder is fed between the edges of said articles, a soldering bar arranged to press said edges together, means for heating said solder while under said bar to fuse the same, means for raising and lowering said bar, a cooling bar arranged to bear upon the soldered edges to cause the solder to set, and means for raising and lowering said cooling bar simultaneously with the like operations of the soldering bar, substantially as set forth.

6. In a soldering machine, in combination with means for conveying articles to be soldered through the machine, means whereby a ribbon of solder is fed between the edges of said articles, means for applying flux to said solder and said edges, a soldering bar arranged to press said edges together, means for heating said solder while under said bar to fuse the same, and means for raising and lowering said bar, substantially as set forth.

7. In a soldering machine, in combination with means for conveying articles to be soldered through the machine, means whereby a ribbon of solder is fed between the edges of said articles, means for applying flux to said solder and said edges, a soldering bar arranged to press said edges together, means for heating said solder while under said bar to fuse the same, means for raising and lowering said bar, a cooling bar arranged to bear upon the soldered edges to cause the solder to set, and means for raising and lowering said cooling bar simultaneously with the like operations of the soldering bar, substantially as set forth.

THOMAS N. COFFELDER.